G. R. BILZ.

PROCESS OF AND APPARATUS FOR SEPARATING SAND.

APPLICATION FILED JULY 6, 1910.

Reissued Jan. 28, 1913.

13,519.

Witnesses:
M. L. Eveland
L. E. Johnston

Inventor:
Gustav R. Bilz,
By M. H. Swearingen,
His Attorney.

UNITED STATES PATENT OFFICE.

GUSTAV REINHOLD BILZ, OF NEW YORK, N. Y.

PROCESS OF AND APPARATUS FOR SEPARATING SAND.

13,519. Specification of Reissued Letters Patent. Reissued Jan. 28, 1913.

Original No. 948,129, dated February 1, 1910, Serial No. 478,311. Application for reissue filed July 6, 1910. Serial No. 570,687.

*To all whom it may concern:*

Be it known that I, GUSTAV REINHOLD BILZ, a citizen of the United States, residing in New York city, in the county of New York and State of New York, have invented new and useful Improvements in Processes of and Apparatus for Separating Sand, of which the following is a specification.

The object of this invention is to provide an improved apparatus for grinding sand or like material, especially the fine sand used for forming molds for casting metals, in which apparatus the grinding member, in the nature of a brush of wire or other material, will engage the sand and force it against a plate, and the sand will be driven from the brush by centrifugal force; and practically pulverized or reduced to a very fine state.

Figure 1:
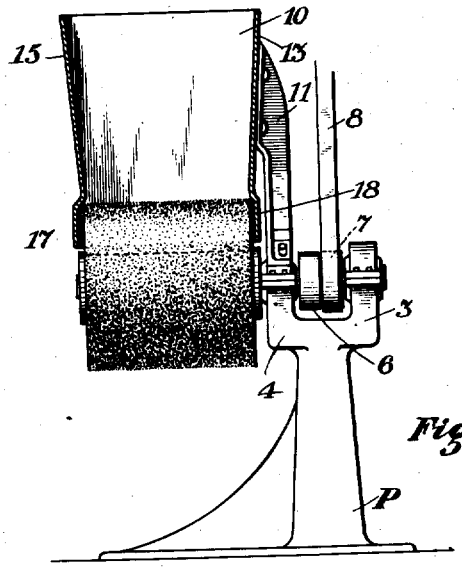
Figure 2:
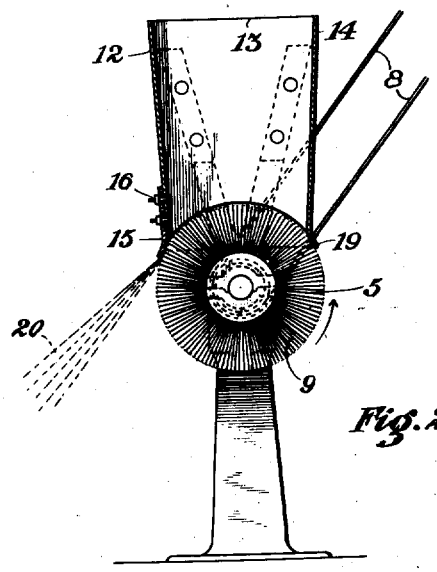

In the drawings representing an embodiment of my invention, Figure 1 shows a front elevation with the receptacle in section; Fig. 2 is a side elevation with the receptacle in section.

The invention comprises essentially a receptacle having an opening in its lower part, into which extends a rotary grinding member, in the nature of a circular brush that practically fills the opening. On a suitable pedestal P, are bearings 3 and 4, in which rotates a shaft 5, having fast and loose pulleys 6 and 7 thereon, whereby the shaft can be driven by a belt 8. On this shaft is secured a rotary or circular grinding member 9, that preferably has its grinding surface formed by wires, in other words is a circular wire brush, and preferably very fine wire is used. A receptacle 10 is suitably carried on the machine, and shown as secured to a bracket 11, extending up from the pedestal. The receptacle has an opening in its lower portion, into which extends the wire brush or centrifugal element 9, that closes the opening. The receptacle is shown as formed by four vertical walls or plates 12, 13, 14 and 15, that form a rectangle in horizontal section. The receptacle has no bottom member, but is placed over the wire brush 9 so that the brush completely closes the bottom and engages the four side walls of the receptacle; the diameter of the brush being slightly greater than the distance between the opposite walls engaging the periphery of the brush, as shown in Fig. 2. One of the walls engaging the periphery of the brush, as the wall 12 has an adjustable plate 15 at its lower end portion slidable up and down and secured by bolts 16, to vary its engagement with the periphery of the wheel and the wheel is rotated so that it will engage this adjustable plate as the wires move out of the receptacle. The opposite wall 14 is preferably slightly bent at 16 where it engages the periphery of the wire brush. Also the bottom portions 17 and 18 of the sides 15 and 13, are slightly bent where they engage the side of the periphery of the brush.

In the operation of the device, the sand or other material is placed in the receptacle, and will at once fall against the periphery of the wheel, that is rotated at a high speed and in the direction shown by the arrow. This will considerably agitate the sand and press it against the adjustable plate 15, whereby the sand will be engaged by the extremities of the wires, that will be thrown outward and kept taut by the centrifugal action. By engagement between the adjustable plate and the wires, the sand will be broken up into very fine particles, and as the wires pass beyond this plate and free of the receptacle, the sand will be thrown off tangentially by centrifugal force, as indicated by the broken lines 20 in Fig. 2.

By this means the sand or other material will be reduced to very fine particles in a very short time and without much expenditure of power. As the plate 15 engaged by the wires to effect the grinding operation, becomes worn the plate is advanced into engagement with the wheel from time to time. Obviously when considerably worn the plate can be substituted by another.

Having thus described my invention, I claim:

1. In combination, a receptacle comprising four substantially upright members inclosing a rectangle, a rotatably supported cylindrical wire brush forming the bottom member of the receptacle, the two sides of the wire brush being in engagement with the two opposite sides of the receptacle, the diameter of the brush being slightly greater than the width of the other two sides of the receptacle whereby the brush can extend a considerable distance into the receptacle and in engagement with the extremities of such two sides, one of said latter sides being extended beyond the receptacle into engagement with the wire brush.

2. In combination, a receptacle comprising four substantially upright members inclosing a rectangle, a rotatably supported cylindrical wire brush forming the bottom member of the receptacle, the two sides of the wire brush being in engagement with two opposite sides of the receptacle, the diameter of the brush being slightly greater than the width of the other two sides of the receptacle whereby the brush can extend a considerable distance into the receptacle and in engagement with the extremities of such two sides, one of said latter sides being extended beyond the receptacle into engagement with the wire brush, said latter side having its engaging portion adjustable in the direction of said side.

3. In a machine for treating sand, the combination comprising a receptacle having a centrifugal element mounted therein and provided with an inlet aperture and outlet aperture for granular material, said centrifugal element being interposed between said apertures, the greater portion of said element lying below the said outlet aperture, and a contact shoe arranged in proximity to said aperture and adapted to engage the periphery of said centrifugal element and control the passage of material through the outlet aperture.

4. The process of treating sand and obtaining the fine particles therefrom, which consists in forming a column of sand, subjecting the particles of sand in the lower portion of said column to the multiplicity of simultaneous centrifugal impulses and effecting the unobstructed centrifugal projection of said particles into space.

5. The process of treating sand and obtaining the fine particles therefrom, which consists in forming a column of sand, subjecting the particles of sand in the lower portion of said column to the multiplicity of simultaneous resilient centrifugal impulses, and effecting the unobstructed centrifugal projection of said particles into space.

Signed at New York, county and State of New York, June 4th, 1910.

GUSTAV REINHOLD BILZ.

Witnesses:

W. H. Swenarton,

R. Mueller.